US011231091B2

(12) United States Patent
Onimaru et al.

(10) Patent No.: US 11,231,091 B2
(45) Date of Patent: Jan. 25, 2022

(54) CHAIN TENSIONER (71) Applicant: NTN CORPORATION, Osaka (JP)

(72) Inventors: Kouichi Onimaru, Shizuoka (JP); Eiji Maeno, Shizuoka (JP)

(73) Assignee: NTN CORPORATION, Osaka (JP)

( * ) Notice: Subject to any disclaimer, the term of this patent is extended or adjusted under 35 U.S.C. 154(b) by 285 days.

(21) Appl. No.: 16/477,244

(22) PCT Filed: Jan. 11, 2018

(86) PCT No.: PCT/JP2018/000430
§ 371 (c)(1),
(2) Date: Jul. 11, 2019

(87) PCT Pub. No.: WO2018/131633
PCT Pub. Date: Jul. 19, 2018

(65) Prior Publication Data
US 2021/0131532 A1 May 6, 2021

(30) Foreign Application Priority Data
Jan. 16, 2017 (JP) .............................. JP2017-005105

(51) Int. Cl.
*F16H 7/08* (2006.01)

(52) U.S. Cl.
CPC ... *F16H 7/0848* (2013.01); *F16H 2007/0806* (2013.01); *F16H 2007/0812* (2013.01);
(Continued)

(58) Field of Classification Search
CPC .............. F16H 7/08; F16H 2007/0802; F16H 2007/0806; F16H 2007/0812;
(Continued)

(56) References Cited
U.S. PATENT DOCUMENTS 4,863,417 A * 9/1989 Kimata ................... F16H 7/08
474/101
5,713,809 A 2/1998 Yamamoto et al.
(Continued)

FOREIGN PATENT DOCUMENTS
EP 2 236 859 10/2010
EP 3 431 814 1/2019
(Continued)

OTHER PUBLICATIONS
WO2009075219A1 Translation; Hayakawa et al. Chain Tensioner; Published: Jun. 18, 2009; Espacenet (Year: 2009).*
(Continued)

*Primary Examiner* — Michael R Mansen
*Assistant Examiner* — Raveen J Dias
(74) *Attorney, Agent, or Firm* — Wenderoth, Lind & Ponack, L.L.P.

(57) ABSTRACT

A chain tensioner is formed with internal threads each including a push-in-side flank, a protruding-side flank, and a thread top face. The push-in-side flank has a flank angle which is larger than a flank angle of the protruding-side flank. The push-in-side flank and the protruding-side flank are rolled surfaces formed by rolling, and have a surface roughness smaller than Ra 1.0 μm. Each internal thread further includes, at a position at which the protruding-side flank intersects with the thread top face, a chamfer configured to receive a bulge resulting from excess materials pushed out from the protruding-side flank during formation of the internal thread by rolling.

16 Claims, 6 Drawing Sheets

(52) U.S. Cl.
CPC ............... *F16H 2007/0842* (2013.01); *F16H 2007/0857* (2013.01); *F16H 2007/0872* (2013.01); *F16H 2007/0891* (2013.01)

(58) Field of Classification Search
CPC ..... F16H 2007/0848; F16H 2007/0857; F16H 2007/0842; F16H 2007/0844; F16H 2007/0859; F16H 2007/0851; F16H 2007/0853; F16H 2007/0855; F16H 2007/0891; F16H 2007/0895; F16H 2007/0897

See application file for complete search history.

(56) References Cited

U.S. PATENT DOCUMENTS

| | | | | |
|---|---|---|---|---|
| 5,879,255 | A * | 3/1999 | Yamamoto | F16H 7/0848 474/110 |
| 7,527,572 | B2 * | 5/2009 | Sato | F16H 7/0836 24/616 |
| 8,834,086 | B2 | 9/2014 | Choi et al. | |
| 2001/0041635 | A1 * | 11/2001 | Ishii | F16H 7/0831 474/101 |
| 2004/0266571 | A1 * | 12/2004 | Izutsu | F16H 7/0848 474/110 |
| 2008/0132366 | A1 * | 6/2008 | Sato | F16H 7/0848 474/138 |
| 2008/0139352 | A1 * | 6/2008 | Sato | F16H 7/0848 474/109 |
| 2008/0261736 | A1 * | 10/2008 | Onimaru | F16H 7/0848 474/110 |
| 2009/0011880 | A1 * | 1/2009 | Sato | F16H 7/0848 474/111 |
| 2010/0087285 | A1 * | 4/2010 | Sato | F16H 7/0848 474/110 |
| 2010/0099529 | A1 | 4/2010 | Sato et al. | |
| 2010/0130320 | A1 * | 5/2010 | Kitano | F16H 7/0836 474/110 |
| 2013/0310206 | A1 * | 11/2013 | Yoshida | F16H 7/0848 474/110 |

FOREIGN PATENT DOCUMENTS

| | | |
|---|---|---|
| JP | 3635188 | 4/2005 |
| JP | 2007-187321 | 7/2007 |
| JP | 2010-032025 | 2/2010 |
| WO | 2009/075219 | 6/2009 |
| WO | 2017/159449 | 9/2017 |

OTHER PUBLICATIONS

International Search Report dated Apr. 10, 2018 in corresponding International (PCT) Application No. PCT/JP2018/000430.
International Preliminary Report on Patentability dated Jul. 16, 2019 in corresponding International (PCT) Application No. PCT/JP2018/000430, with English translation.

* cited by examiner

CHAIN TENSIONER

TECHNICAL FIELD

The present invention relates to a chain tensioner used to maintain the tension of a timing chain for driving the camshafts of an automobile engine.

BACKGROUND ART

In automobile engines, generally, the rotation of the crankshaft is transmitted to the camshafts by a timing chain (hereinafter simply referred to as the "chain") to rotate the camshafts, thereby opening and closing the valves of the combustion chambers. In order to maintain the tension of the chain within a suitable range, a tension adjusting device is frequently used which comprises a chain guide pivotable about a fulcrum shaft, and a chain tensioner that presses the chain through the chain guide.

As the chain tensioner mounted to the tension adjusting device, a chain tensioner is known which includes a tubular cylinder having a bottom, and a plunger axially slidably inserted in the cylinder (e.g., see the below-identified Patent Document 1).

This chain tensioner is configured such that, when the tension of the chain increases during the operation of the engine, due to the tension of the chain, the plunger moves in the direction in which the plunger is pushed into the cylinder, thereby absorbing the tension of the chain, and when the tension of the chain decreases during the operation of the engine, the plunger moves in the direction in which the plunger protrudes from the cylinder, thereby absorbing the looseness of the chain.

While the engine is not running, the tension of the chain may remain high depending on the stop positions of the camshafts. At this time, if, according to the tension of the chain, the plunger moves to a large degree in the direction in which the plunger is pushed into the cylinder, when the engine is started later, the chain could slack to such an extent as to cause flapping and/or skipping of teeth of sprockets.

In order to limit the movement of the plunger while the engine is not running, Patent Document 1 proposes to form internal threads on the inner periphery of the plunger; provide a screw rod including, on its outer periphery, external threads threadedly engaged with the internal threads; and provide a return spring disposed between the screw rod and the plunger, and biasing the plunger in the direction in which the plunger protrudes from the cylinder.

For the chain tensioner of Patent Document 1, each of the external threads on the outer periphery of the screw rod and the internal threads on the inner periphery of the plunger has a serrated shape such that the push-in-side flank of each thread, i.e., the flank configured to receive pressure when a load that tends to push the plunger into the cylinder is applied, has a larger flank angle than the protruding-side flank, i.e., the flank configured to receive pressure when a load that tends to cause the plunger to protrude from the cylinder is applied.

PRIOR ART DOCUMENTS

Patent Documents

Patent document 1: Japanese Patent No. 3635188

SUMMARY OF THE INVENTION

Problems to be Solved by the Invention

For the conventional chain tensioner of Patent document 1, internal threads are formed on the inner periphery of the plunger with a cutting tap, and thus have cut surfaces.

The inventor of the present invention realized that, if the surfaces of the internal threads on the inner periphery of the plunger are not cut surfaces formed by cutting, but rolled surfaces formed by rolling, since a rolled surface has a smaller surface roughness than a cut surface, the plunger and the screw rod should be capable of more smoothly slide relative to each other between the protruding-side flanks of the internal threads on the inner periphery of the plunger, and the protruding-side flanks of the external threads on the outer periphery of the screw rod, so that the screw rod and the plunger are capable of smoothly moving relative to each other in the direction in which the plunger protrudes from the cylinder, namely, the plunger is capable of quickly protruding from the cylinder so as to quickly absorb the looseness of a chain.

However, if the internal threads are formed on the inner periphery of the plunger by rolling, due to excess materials pushed out from the respective protruding-side flanks of the internal threads during rolling, bulges are formed on the thread top faces of the internal threads, and the bulges could interfere with the root surfaces of the external threads on the outer periphery of the screw rod. Especially if the root surfaces of the external threads on the outer periphery of the screw rod are rounded surfaces having a circular arc-shaped cross section, the bulges are more likely to interfere with the root surfaces of the external threads.

If the bulges on the thread top faces of the internal threads on the inner periphery of the plunger interfere with the root surfaces of the external threads on the outer periphery of the screw rod, this will make it difficult for the screw rod and the plunger to rotate relative to each other, that is, make it difficult for the screw rod and the plunger to move relative to each other in the direction in which the plunger protrudes from the cylinder in a reliable and stable manner.

It is an object of the present invention to provide a chain tensioner capable of quickly and smoothly protruding, thereby quickly absorbing the looseness of the chain.

Means for Solving the Problems

In order to achieve the above object, the present invention provides a chain tensioner comprising: a tubular cylinder having a bottom; a tubular plunger axially slidably inserted in the cylinder, the tubular plunger having an open end inserted in the cylinder, and a closed end protruding beyond the cylinder; an internal thread on an inner periphery of the plunger; a screw rod including, on an outer periphery of the screw rod, an external thread threadedly engaged with the internal thread; and a return spring disposed between the screw rod and the plunger, and configured to bias the plunger in a direction in which the plunger protrudes from the cylinder, wherein the internal thread comprises: a push-in-side flank configured to receive pressure when a load that tends to push the plunger into the cylinder is applied; a protruding-side flank configured to receive pressure when a load that tends to cause the plunger to protrude from the cylinder is applied; and a thread top face between the push-in-side flank and the protruding-side flank, and wherein the push-in-side flank has a flank angle larger than a flank angle of the protruding-side flank, characterized in that each of the push-in-side flank and the protruding-side flank of the internal thread comprises a rolled surface having a surface roughness smaller than Ra 1.0 µm, wherein the internal thread further includes, at a position of the internal thread at which the protruding-side flank intersects with the thread top face, a chamfer configured to receive a bulge from the protruding-side flank during rolling.

With this arrangement, since the protruding-side flank of the internal thread on the inner periphery of the plunger is a rolled surface formed by rolling and having a surface roughness smaller than Ra 1.0 µm, the plunger and the screw rod smoothly slide relative to each other between the protruding-side flank of the internal thread on the inner periphery of the plunger, and the protruding-side flank of the external thread on the outer periphery of the screw rod. Therefore, the screw rod and the plunger are capable of smoothly moving relative to each other in the direction in which the plunger protrudes from the cylinder, namely, the plunger is capable of quickly protruding from the cylinder so as to quickly absorb the looseness of a chain. Also, since the internal thread includes, at its position at which the protruding-side flank and the thread top face of the internal thread intersect with each other, a chamfer configured to receive a bulge resulting from rolling of the protruding-side flank, it is possible to prevent the bulge from interfering with the root surface of the external thread on the outer periphery of the screw rod. Therefore, the screw rod and the plunger are capable of moving relative to each other in the direction in which the plunger protrudes from the cylinder, in a reliable and stable manner.

The chamfer preferably comprises an inclined surface having an angle of 30 to 50 degrees relative to the thread top face in a cross section including a center line of the internal thread.

Since the chamfer has an angle of 30 degrees or more relative to the thread top face, it is deep enough to effectively prevent the bulge due to rolling of the protruding-side flank from interfering with the root surface of the external thread on the outer periphery of the screw rod. Also, since the chamfer has an angle of 50 degrees or less relative to the thread top face, the protruding-side flank of the internal thread has a sufficient area such that the surface pressure between the protruding-side flank of the external thread and the protruding-side flank of the internal thread is low enough to allow smooth relative movement between the screw rod and the plunger in the direction in which the plunger protrudes from the cylinder.

If the flank angle of the push-in-side flank is set within a range of 64 to 66 degrees, by setting the flank angle of the protruding-side flank within a range of 6 to 8 degrees, it is possible to suitably form the push-in-side flank and the protruding-side flank of the internal thread by rolling.

If the flank angle of the push-in-side flank is set within a range of 74 to 76 degrees, by setting the flank angle of the protruding-side flank within a range of 14 to 16 degrees, it is possible to suitably form the push-in-side flank and the protruding-side flank of the internal thread by rolling.

The plunger may be made of one of SCM material and SCr material.

The screw rod may be made of one of SCM material and SCr material.

The cylinder may comprise an externally mounted cylinder including a flange fixed to an outer surface of an engine cover of an engine with the cylinder inserted in a tensioner attachment hole of the engine cover.

The cylinder may comprise an internally mounted cylinder mounted internally of an engine and including a plurality of attachment pieces fixed to a side surface of an engine block of the engine by bolts.

Effects of the Invention

For the chain tensioner of the present invention, since the protruding-side flank of the internal thread on the inner periphery of the plunger is a rolled surface having a surface roughness smaller than Ra 1.0 µm, the plunger and the screw rod more smoothly slide relative to each other between the protruding-side flank of the internal thread on the inner periphery of the plunger, and the protruding-side flank of the external thread on the outer periphery of the screw rod. Therefore, the screw rod and the plunger are capable of smoothly moving relative to each other in the direction in which the plunger protrudes from the cylinder, namely, the plunger is capable of quickly protruding from the cylinder so as to quickly absorb the looseness of a chain. Also, since the internal thread includes, at its position at which the protruding-side flank and the thread top face of the internal thread intersect with each other, a chamfer configured to receive a bulge resulting from rolling of the protruding-side flank, the bulge is less likely to interfere with the root surface of the external thread on the outer periphery of the screw rod. Therefore, the screw rod and the plunger are capable of moving relative to each other in the direction in which the plunger protrudes from the cylinder, in a reliable and stable manner.

BEST MODE FOR CARRYING OUT THE INVENTION

Figure 1:
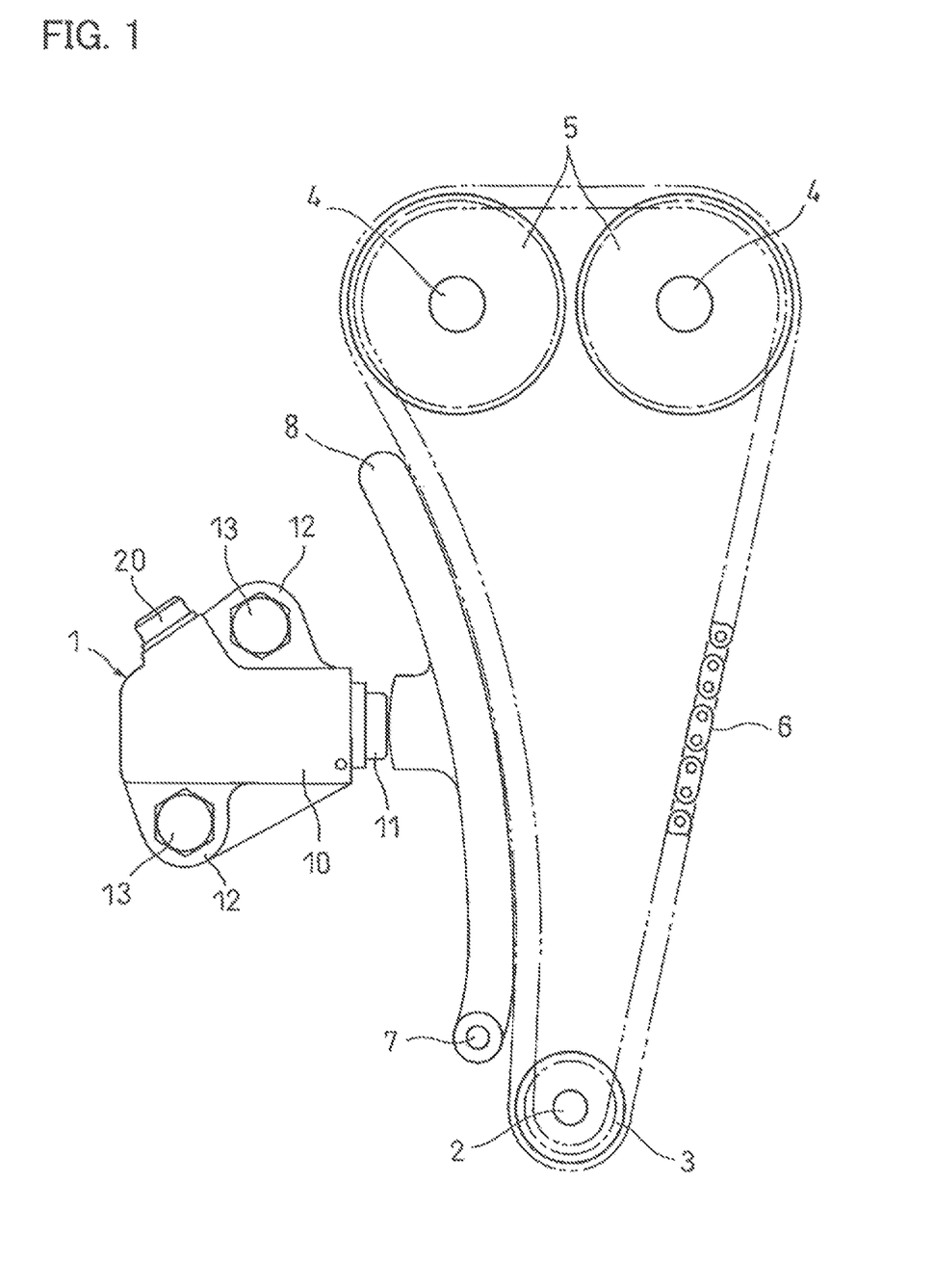
FIG. 1 is a front view of a chain transmission device in which a chain tensioner embodying the present invention is used.

FIG. 1 illustrates a chain transmission device in which a chain tensioner 1 embodying the present invention is used. This chain transmission device includes a sprocket 3 fixed to the crankshaft 2 of an engine; sprockets 5 fixed to respective camshafts 4; and a chain 6 through which the sprocket 3 is coupled to the sprockets 5. The rotation of the crankshaft 2 is transmitted to the camshafts 4 by the chain 6 so as to rotate the camshafts 4, thereby opening and closing the valves (not shown) of the combustion chambers of the engine.

A chain guide 8 supported to be pivotable about a fulcrum shaft 7 is in contact with the chain 6. The chain tensioner 1 presses the chain 6 through the chain guide 8.

Figure 2:
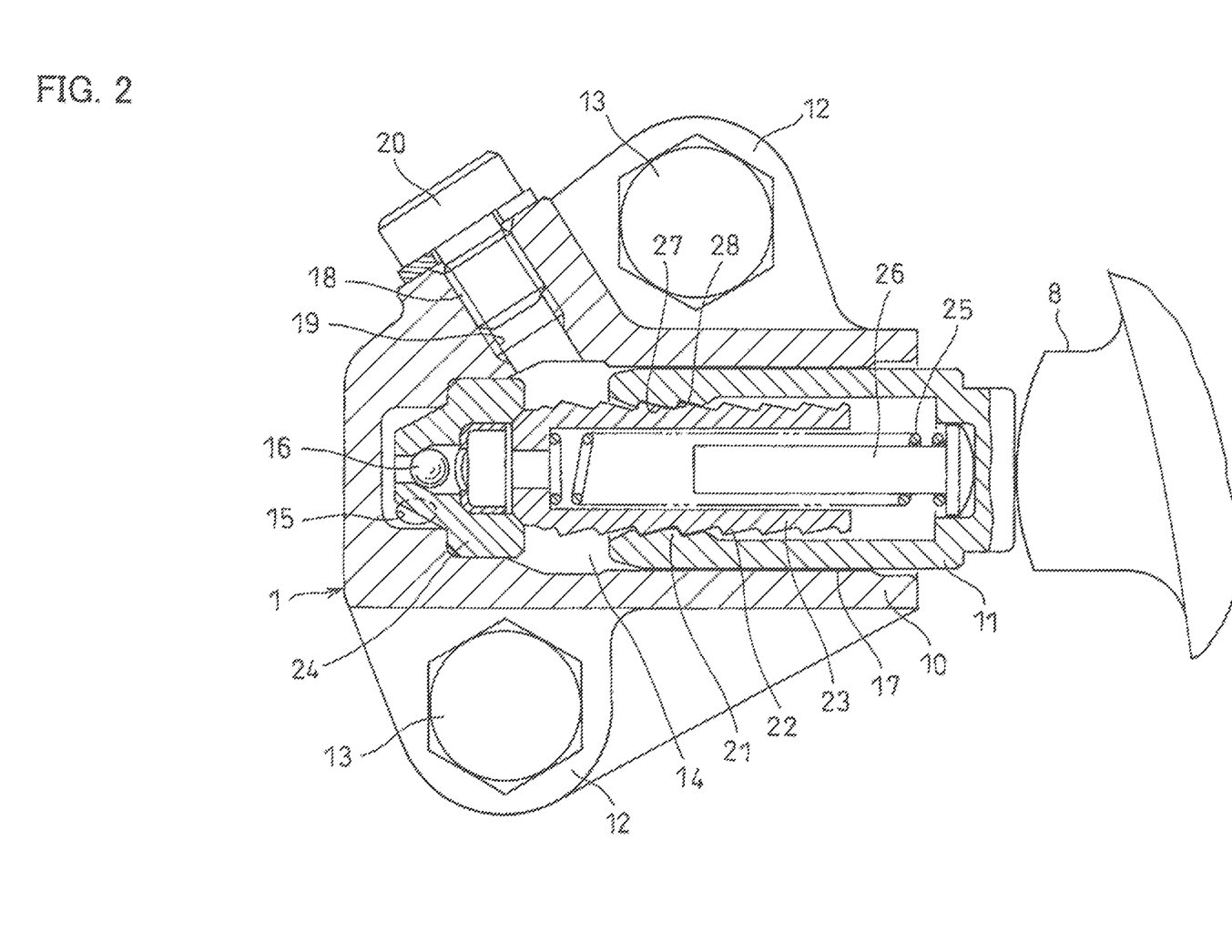
FIG. 2 is an enlarged sectional view of the chain tensioner of FIG. 1 and its vicinity.

As illustrated in FIG. 2, the chain tensioner 1 includes a tubular cylinder 10 having a bottom; and a plunger 11 axially slidably inserted in the cylinder 10. The cylinder 10 is made of an aluminum alloy, and fixed to a side surface of an engine block by tightening bolts 13, respectively, into a plurality of attachment pieces 12 integral with the outer periphery of the cylinder 10 as illustrated in FIG. 1.

As illustrated in FIG. 2, the plunger 11 is a tubular member having an open end inserted in the cylinder 10, and a closed end protruding beyond the cylinder 10. The plunger 11 is made of a steel material, preferably SCM material or SCr material (SCM material in the embodiment).

The cylinder 10 includes, at its closed end portion, an oil supply passage 15 communicating with a pressure chamber 14 surrounded and defined by the cylinder 10 and the plunger 11. The oil supply passage 15 is connected to an oil pump (not shown) through an oil hole (not shown) formed in the engine block so that hydraulic oil discharged from the oil pump is introduced into the pressure chamber 14 through the oil supply passage 15. A check valve 16 is disposed at the end of the oil supply passage 15 facing the pressure chamber 14, and allows only the flow of hydraulic oil from the oil supply passage 15 toward the pressure chamber 14.

A minute leakage gap 17 is defined between the sliding surfaces of the plunger 11 and the cylinder 10 so that hydraulic oil in the pressure chamber 14 leaks out of the cylinder 10 through the leakage gap 17.

The cylinder 10 has, at its closed end portion, an air vent passage 18 through which the interior of the cylinder 10 communicates with its exterior. Specifically, the cylinder 10 has, at its closed end portion, a threaded hole 19 extending through the cylinder 10 from the outside thereof to the pressure chamber 14, and an externally threaded member 20 is screwed into the threaded hole 19 to define, between the threaded hole 19 and the externally threaded member 20, a minute helical gap that constitutes the air vent passage 18. That is, through the minute helical gap as the air vent passage 18, air in the pressure chamber 14 is released to the outside.

The plunger 11 includes internal threads 21 on its inner periphery. A screw rod 23 including external threads 22 on its outer periphery is disposed in the pressure chamber 14 with the external threads 22 threadedly engaged with the internal threads 21 of the plunger 11. One end of the screw rod 23 protrudes beyond the plunger 11, and is in abutment with, and supported by, a rod seat 24 disposed at the closed end of the cylinder 10 (in the embodiment, the rod seat 24 is a portion of the check valve 16). The screw rod 23 is made of a steel material, preferably SCM material or SCr material (SCM material in the embodiment).

A return spring 25 is mounted between the screw rod 23 and the end of the plunger 11 protruding beyond the cylinder 10. One end of the return spring 25 is supported by the end of the screw rod 23 protruding beyond the plunger 11. The other end of the return spring 25 presses, through a spring seat 26, the end of the plunger 11 protruding beyond the cylinder 10, thereby biasing the plunger 11 in the direction in which the plunger 11 protrudes from the cylinder 10.

Figure 3:
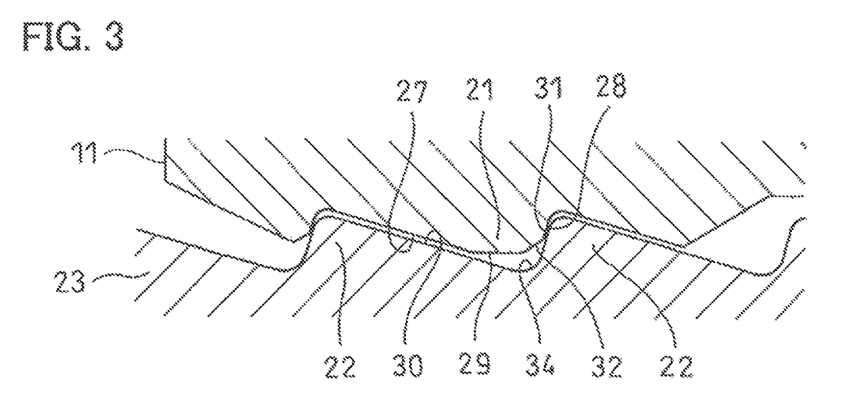
FIG. 3 is an enlarged sectional view illustrating internal threads disposed on the inner periphery of the plunger illustrated in FIG. 2, and the vicinity of the internal threads.

As illustrated in FIG. 3, the internal threads 21 on the inner periphery of the plunger 11 each includes a push-in-side flank 27 configured to receive pressure when a load that tends to push the plunger 11 into the cylinder 10 is applied; a protruding-side flank 28 configured to receive pressure when a load that tends to cause the plunger 11 to protrude from the cylinder 10 is applied; and a thread top face 29 defined between the push-in-side flank 27 and the protruding-side flank 28.

Figure 4:
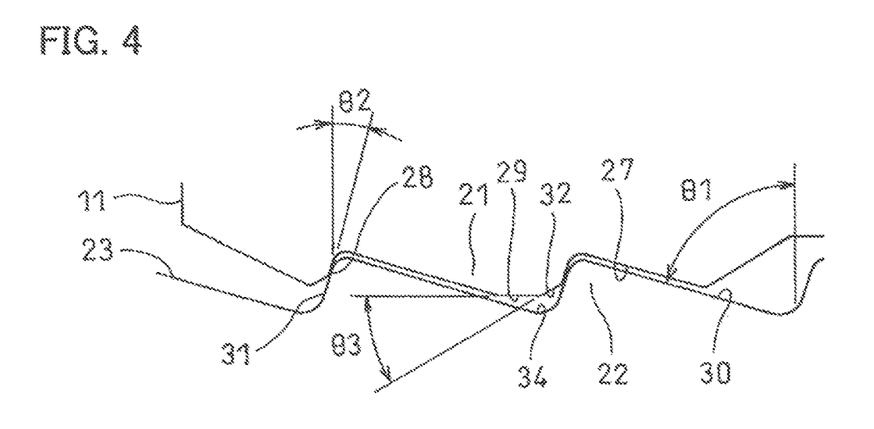
FIG. 4 is a view illustrating the flank angles of the external and internal threads illustrated in FIG. 3, and the inclination angles of the chamfers illustrated in FIG. 3.

As illustrated in FIG. 4, the internal threads 21 each has a serrated shape such that the push-in-side flank 27 has a flank angle $\theta 1$ larger than the flank angle $\theta 2$ of the protruding-side flank 28. Similarly, each external thread 22 also has a serrated shape such that the push-in-side flank 30 configured to receive pressure when a load that tends to push the plunger 11 into the cylinder 10 is applied has a larger flank angle $\theta 1$ than the flank angle $\theta 2$ of the protruding-side flank 31 configured to receive pressure when a load that tends to cause the plunger 11 to protrude from the cylinder 10 is applied. The flank angle $\theta 1$ of the push-in-side flank 30 of each external thread 22 is equal to the flank angle $\theta 1$ of the push-in-side flank 27 of the corresponding internal thread 21. The flank angle $\theta 2$ of the protruding-side flank 31 of each external thread 22 is also equal to the flank angle $\theta 2$ of the protruding-side flank 28 of the corresponding internal thread 21.

The flank angles $\theta 1$ of the push-in-side flanks 27 of the internal threads 21 are set within the range of 64 to 76 degrees. By setting the flank angles $\theta 1$ of the push-in-side flanks 27 at 64 degrees or more, when an axial load tending to cause the screw rod 23 to be inserted into the plunger 11 is statically applied between the screw rod 23 and the plunger 11, it is possible to reliably prevent slippage between the push-in-side flanks 27 of the internal threads 21 and the respective push-in-side flanks 30 of the external threads 22. By setting the flank angles $\theta 1$ of the push-in-side flanks 27 at 76 degrees or less, when an axial load tending to cause the screw rod 23 to be inserted into the plunger 11 is applied between the screw rod 23 and the plunger 11, it is possible to prevent each external thread 22 and the corresponding internal thread 21 from becoming wedged against each other and locked.

The flank angles $\theta 2$ of the protruding-side flanks 28 of the internal threads 21 are set within the range of 6 to 16 degrees. By setting the flank angles $\theta 2$ of the protruding-side flanks 28 at 16 degrees or less, when an axial load tending to cause the plunger 11 to protrude from the cylinder 10 is statically applied between the screw rod 23 and the plunger 11, the protruding-side flanks 28 of the internal threads 21 and the protruding-side flanks 31 of the respective external threads 22 slip relative to each other, thus allowing smooth relative movement between the screw rod 23 and the plunger 11 in the direction in which the plunger 11 protrudes from the cylinder 10.

If the flank angles $\theta 1$ of the push-in-side flanks 27 of the internal threads 21 are set within the range of 64 to 66 degrees, by setting the flank angles $\theta 2$ of the protruding-side flanks 28 of the internal threads 21 within the range of 6 to 8 degrees, it is possible to suitably form the push-in-side flanks 27 and the protruding-side flanks 28 of the internal threads 21 by rolling. Similarly, if the flank angles $\theta 1$ of the push-in-side flanks 27 are set within the range of 74 to 76 degrees, by setting the flank angles $\theta 2$ of the protruding-side flanks 28 within the range of 14 to 16 degrees, it is possible to suitably form the push-in-side flanks 27 and the protruding-side flanks 28 by rolling.

As illustrated in FIG. 3, each internal thread includes a chamfer 32 at its position at which the protruding-side flank 28 intersects with the thread top face 29. As illustrated in FIG. 4, the chamfer 32 is an inclined surface having an angle θ3 of 30 to 50 degrees relative to the thread top face 29 in a cross section including the center line of the internal thread 21.

The push-in-side flank 27 and the protruding-side flank 28 of each internal thread 21 are rolled surfaces formed by rolling, whereas the chamfer 32 is a cut surface formed by cutting, and the thread top face 29 is a forged surface formed by forging. Each rolled surface has a surface roughness smaller than that of the cut surface, specifically, smaller than Ra 1.0 μm (preferably Ra 0.5 μm).

Next, it is described how the chain tensioner 1 operates.

When the tension of the chain 6 increases during the operation of the engine, due to the axial load tending to push the plunger 11 into the cylinder 10, the push-in side flanks 27 of the internal threads 21 on the inner periphery of the plunger 11 abut against the push-in-side flanks 30 of the respective external threads 22 on the outer periphery of the screw rod 23. Thereafter, slippage between the push-in-side flanks 27 of the internal threads 21 and the push-in-side flanks 30 of the external threads 22 caused by the vibration of the chain 6 accumulates. As a result thereof, the screw rod 23 is gradually inserted into the plunger 11, and as a result, the plunger 11 gradually moves in the direction in which the plunger 11 is pushed into the cylinder 10, thereby absorbing the tension of the chain 6. At this time, since the slippage between the push-in-side flanks 27 of the internal threads 21 and the push-in-side flanks 30 of the external threads 22 caused by the vibration of the chain 6 is minute, the moving speed of the plunger 11 is limited, that is, the chain tensioner produces a damper effect.

On the other hand, when the tension of the chain 6 decreases during the operation of the engine, the plunger 11 protrudes from the cylinder 10, thereby absorbing looseness of the chain 6. At this time, due to the biasing force of the return spring 25, the protruding-side flanks 28 of the internal threads 21 on the inner periphery of the plunger 11 abut against the protruding-side flanks 31 of the external threads 22 on the outer periphery of the screw rod 23, and the screw rod 23 rotates due to slippage between the protruding-side flanks 28 of the internal threads 21 and the protruding-side flanks 31 of the external threads 22, so that the plunger 11 moves in the direction in which the plunger 11 protrudes from the cylinder 10.

While the engine is not running, the tension of the chain 6 may remain high depending on the stop positions of the camshafts 4. In this case, since the chain 6 does not vibrate, no slippage occurs between the push-in side flanks 27 of the internal threads 21 on the inner periphery of the plunger 11, and the push-in-side flanks 30 of the external threads 22 on the outer periphery of the screw rod 23, and thus the screw rod 23 is fixed in position. Therefore, when the engine is started again, the chain 6 is less likely to become loose, so that the engine can be started smoothly.

The plunger 11 of the chain tensioner 1 according to the embodiment is manufactured as follows: First, a tubular member to be formed into the plunger 11 is formed by cold-forging (cold-forging step). Next, rough internal threads to be formed into the internal threads 21 are formed on the inner periphery of the tubular member by cutting, and the chamfers 32 are formed by cutting the portions of the internal threads 21 at which the protruding-side flanks 28 intersect with the respective thread top faces 29 (cutting step). The chamfers 32 can be easily formed by cutting using a cutting tap including chamfering portions for forming the chamfers 32 which are located at the roots of threads for forming the rough threads. After the cutting step, by finishing the surfaces of the rough internal threads by rolling, the push-in-side flanks 27 and the protruding-side flanks 28 of the internal threads 21 are formed (rolling and finishing step). In this rolling and finishing step, the push-in-side flanks 27 and the protruding-side flanks 28 of the internal threads 21 are formed into rolled surfaces each having a surface roughness smaller than Ra 1.0 μm (preferably Ra 0.5 μm).

Figure 5:
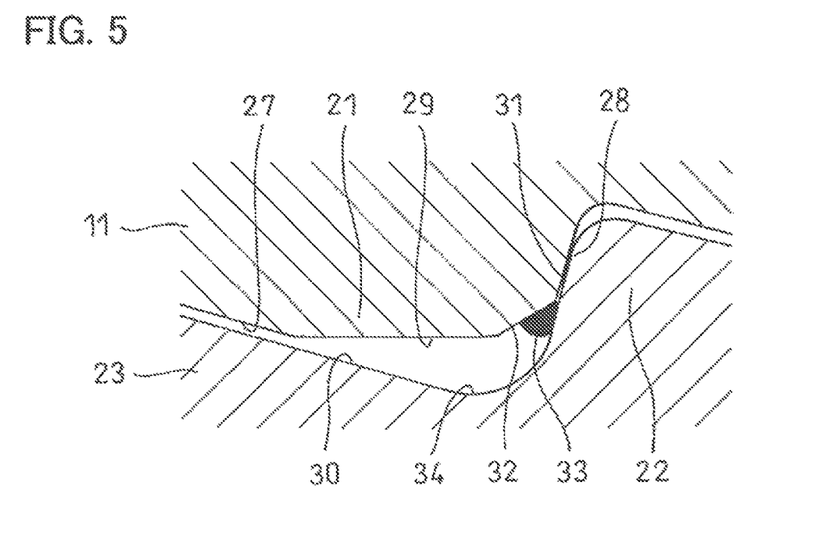
FIG. 5 is an enlarged view illustrating the state in which bulges generated during rolling are received on the chamfers each formed at the position of the internal thread at which the protruding-side flank and the thread top face of the internal thread intersect with each other.
Figure 6:
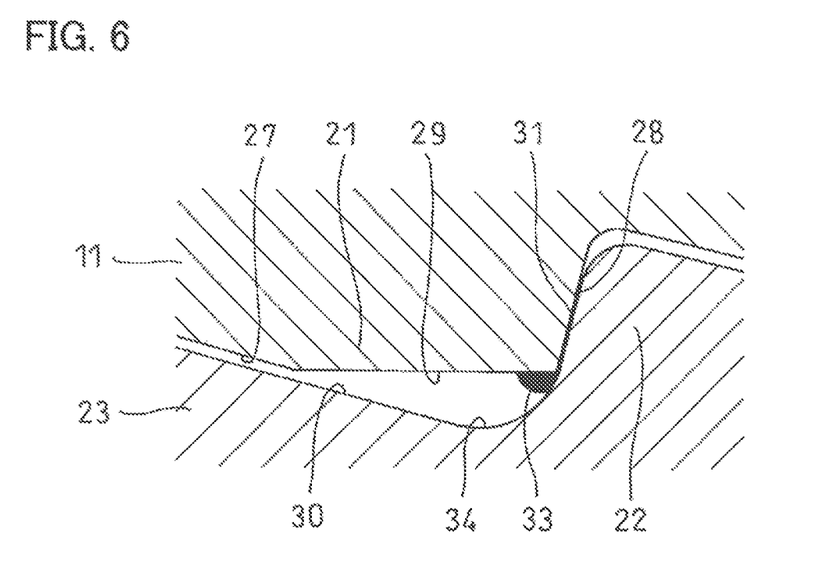
FIG. 6 is a view illustrating, as a Comparative Example, internal threads on which the chamfers of FIG. 5 are not disposed.

If, as illustrated in FIG. 6, there is not the chamfer 32 illustrated in FIG. 5 at the position of each internal thread 21 at which the protruding-side flank 28 intersects with the thread ridge top face 29, due to excess materials pushed out from the respective protruding-side flanks 28 when the internal threads 21 are formed on the inner periphery of the plunger 11 by rolling, bulges 33 are formed on the thread top faces 29 of the internal threads 21, and such bulges 33 could interfere with the root surfaces 34 (rounded surfaces having a circular arc-shaped cross section) of the external threads 22 on the outer periphery of the screw rod 23. The interference of the bulges 33 with the root surfaces 34 of the external threads 22 will make it difficult for the screw rod 23 and the plunger 11 to rotate relative to each other, that is, make it difficult for the screw rod 23 and the plunger 11 to move relative to each other, in a reliable and stable manner in the direction in which the plunger 11 protrudes from the cylinder 10.

In contrast thereto, since, as illustrated in FIG. 5, the chain tensioner 1 of the embodiment includes a chamfer 32 at the position of each internal thread 21 at which the protruding-side flank 28 intersects with the thread top face 29, bulges 33 resulting from excess materials pushed out from the protruding-side flanks 28 due to rolling are received on the chamfers 32. This prevents the bulges 33 from interfering with the root surfaces 34 of the external threads 22 on the outer periphery of the screw rod 23, which in turn allows the screw rod 23 and the plunger 11 to move relative to each other in the direction in which the plunger 11 protrudes from the cylinder 10, in a reliable and stable manner.

Also, since, for the chain tensioner 1 of the embodiment, the protruding-side flanks 28 of the internal threads 21 on the inner periphery of the plunger 11 are rolled surfaces (formed by rolling) each having a surface roughness smaller than Ra 1.0 μm (preferably Ra 0.5 μm), the plunger 11 and the screw rod 23 smoothly slide relative to each other between the protruding-side flanks 28 of the internal threads 21 on the inner periphery of the plunger 11, and the protruding-side flanks 31 of the external threads 22 on the outer periphery of the screw rod 23. Therefore, the screw rod 23 and the plunger 11 are capable of smoothly moving relative to each other in the direction in which the plunger 11 protrudes from the cylinder 10, namely, the plunger 11 is capable of quickly protruding from the cylinder 10 so as to quickly absorb the looseness of the chain 6.

Also, since, for the chain tensioner 1 of the embodiment, the chamfers 32 each has an angle θ3 of 30 degrees or more relative to the thread top face 29, the chamfers 32 are deep enough to effectively prevent bulges 33 that form due to rolling of the protruding-side flanks 28 from interfering with the root surfaces 34 of the external threads 22 on the outer periphery of the screw rod 23. Also, since the chamfers 32 each has an angle 0.3 of 50 degrees or less relative to the thread top face 29, the protruding-side flanks 28 of the internal threads 21 each has a sufficient area such that the surface pressure between the protruding-side flanks 31 of the external threads 22 and the protruding-side flanks 28 of the internal threads 21 is low enough to allow smooth relative movement between the screw rod 23 and the plunger 11 in the direction in which the plunger 11 protrudes from the cylinder 10.

Figure 7:
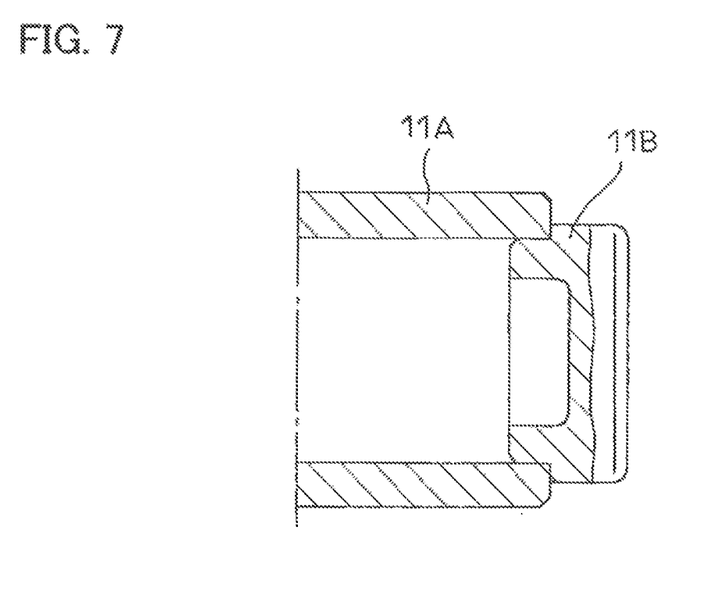
FIG. 7 is a variation of the plunger illustrated in FIG. 2.

While the plunger 11 is exemplified as a seamless, integral member in the above embodiment, the plunger 11 is preferably constituted, as illustrated in FIG. 7, by a tubular member 11A having two open ends, and including internal threads 21 on its inner periphery; and a cap member 11B fitted to one of the two open ends of the tubular member 11A. With this arrangement, since the tubular member 11A has two open ends, the internal threads 21 can be formed easily on the tubular member 11A.

Figure 8:
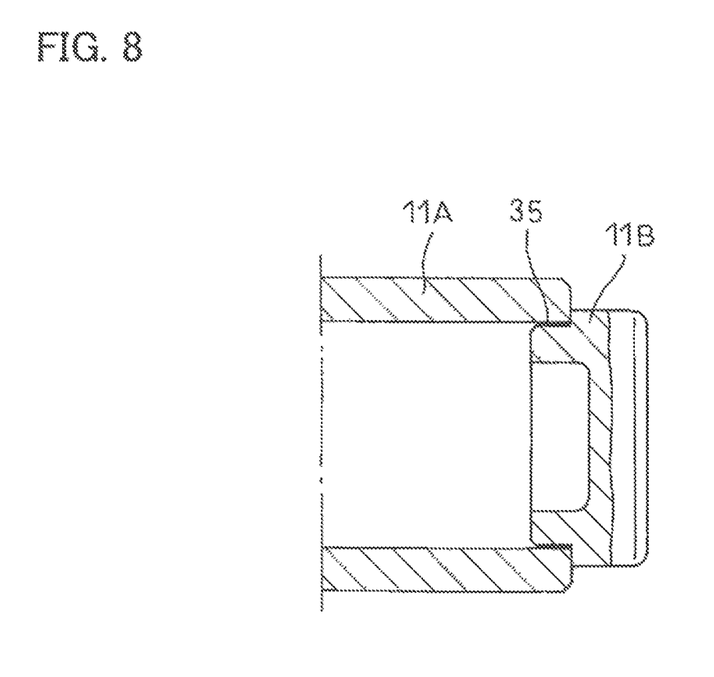
FIG. 8 is another variation of the plunger illustrated in FIG. 2.

The cap member 11B is fixedly press-fitted to one of the two open ends of the tubular member 11A in FIG. 7, but may be press-fitted and joined to one of the two open ends of the tubular member 11A by "press-fitting projection joining" as illustrated in FIG. 8. "Press-fitting projection joining" is a method by which the cap member 11B is press-fitted to the tubular member A while supplying an electric current between the cap member 11B and the tubular member 11A. By this method, when the cap member 11B is press-fitted to the tubular member 11A, an impurity layer is removed from the surface of the cap member 11B, and this surface becomes clean, so that the fitting surfaces 35 of the tubular member 11 and the cap member 35 are welded together in a solid state.

Figure 9:
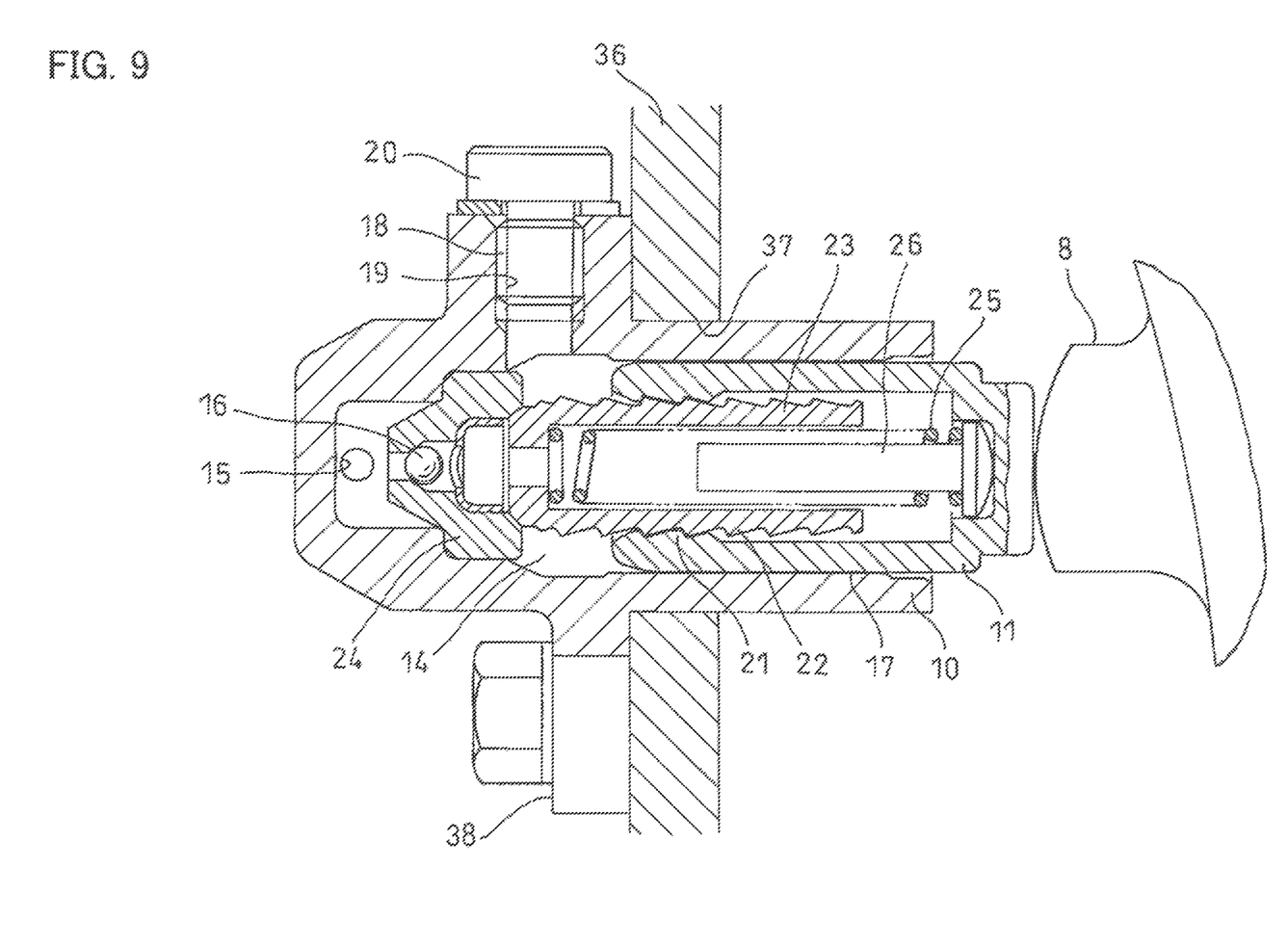
FIG. 9 is a view of an externally mounted chain tensioner to which the present invention is applied.

While, in the above embodiment, the chain tensioner 1 is an internally mounted tensioner mounted to a side surface of the engine block of the engine so that the chain tensioner 1 is located inside of the engine cover, the present invention can be also applied to an externally mounted chain tensioner, i.e., a chain tensioner mounted to the engine cover 36 as illustrated in FIG. 9. In the example of FIG. 9, the cylinder 10 includes a flange 38 fixed to the outer surface of the engine cover 36 with the cylinder 10 inserted in a tensioner attachment hole 37 of the engine cover 36.

The above embodiment is merely an example in every respect, and the present invention is not limited to the above embodiment. The scope of the present invention is indicated not by the above description but by the claims, and should be understood to include all modifications within the scope and the meaning equivalent to the scope of the claims.

DESCRIPTION OF REFERENCE NUMERALS

1: chain tensioner
10: cylinder
11: plunger
11A: tubular member
11B: cap member
12: attachment piece
13: bolt
21: internal thread
22: external thread
23: screw rod
25: return spring
27: push-in-side flank
28: protruding-side flank
29: thread top face
32: chamfer
33: bulge
36: engine cover
37: tensioner attachment hole
38: flange
θ1, θ2: flank angle
θ3: angle

The invention claimed is:

1. A chain tensioner comprising:
a tubular cylinder having a bottom;
a tubular plunger axially slidably inserted in the tubular cylinder, the tubular plunger having an open end inserted in the tubular cylinder, and a closed end protruding beyond the tubular cylinder;
an internal thread on an inner periphery of the tubular plunger;
a screw rod including, on an outer periphery of the screw rod, an external thread threadedly engaged with the internal thread; and
a return spring disposed between the screw rod and the tubular plunger, and configured to bias the tubular plunger in a direction in which the tubular plunger protrudes from the tubular cylinder,
wherein the internal thread comprises:
a push-in-side flank configured to receive pressure when a load that tends to push the tubular plunger into the tubular cylinder is applied;
a protruding-side flank configured to receive pressure when a load that tends to cause the tubular plunger to protrude from the tubular cylinder is applied; and
a thread top face between the push-in-side flank and the protruding-side flank,
wherein the push-in-side flank has a first flank angle which is an angle defined between a surface of the push-in-side flank and a vertical axis,
wherein the protruding-side flank has a second flank angle which is an angle defined between a surface of the protruding-side flank and the vertical axis,
wherein the first flank angle is larger than the second flank angle,
wherein each of the push-in-side flank and the protruding-side flank of the internal thread comprises a rolled surface having a surface roughness smaller than Ra_1.0 μm, and
wherein the internal thread further includes, at a position of the internal thread at which the protruding-side flank intersects with the thread top face, a chamfer configured to receive a bulge resulting from excess materials pushed out from the protruding-side flank during formation of the internal thread by rolling.

2. The chain tensioner according to claim 1, wherein the chamfer comprises an inclined surface having an angle of 30 to 50 degrees relative to the thread top face in a cross section including a center line of the internal thread.

3. The chain tensioner according to claim 2, wherein the first flank angle is within a range of 64 to 66 degrees, and the second flank angle is within a range of 6 to 8 degrees.

4. The chain tensioner according to claim 3, wherein the screw rod is made of Chromium Molybdenum Steel (SCM) or Chromium Steel (SCr) material.

5. The chain tensioner according to claim 2, wherein the first flank angle is within a range of 74 to 76 degrees, and the second flank angle is within a range of 14 to 16 degrees.

6. The chain tensioner according to claim 5, wherein the screw rod is made of Chromium Molybdenum Steel (SCM) or Chromium Steel (SCr) material.

7. The chain tensioner according to claim 2, wherein the screw rod is made of Chromium Molybdenum Steel (SCM) or Chromium Steel (SCr) material.

8. The chain tensioner according to claim 1, wherein the first flank angle is within a range of 64 to 66 degrees, and the second flank angle is within a range of 6 to 8 degrees.

9. The chain tensioner according to claim 8, wherein the screw rod is made of Chromium Molybdenum Steel (SCM) or Chromium Steel (SCr) material.

10. The chain tensioner according to claim 1, wherein the first flank angle is within a range of 74 to 76 degrees, and the second flank angle is within a range of 14 to 16 degrees.

11. The chain tensioner according to claim 10, wherein the screw rod is made of Chromium Molybdenum Steel (SCM) or Chromium Steel (SCr) material.

12. The chain tensioner according to claim 1, wherein the tubular plunger is made of Chromium Molybdenum Steel (SCM) or Chromium Steel (SCr) material.

13. The chain tensioner according to claim 12, wherein the screw rod is made of Chromium Molybdenum Steel (SCM) or Chromium Steel (SCr) material.

14. The chain tensioner according to claim 1, wherein the screw rod is made of Chromium Molybdenum Steel (SCM) or Chromium Steel (SCr) material.

15. The chain tensioner according to claim 1, wherein the tubular cylinder comprises an externally mountable cylinder including a flange configured to be fixed to an outer surface of an engine cover of an engine with the tubular cylinder configured to be inserted in a tensioner attachment hole of the engine cover.

16. The chain tensioner according to claim 1, wherein the tubular cylinder comprises an internally mountable cylinder configured to be mounted internally in an engine and including a plurality of attachment pieces configured to be fixed to a side surface of an engine block of the engine by bolts.

* * * * *